July 10, 1951

R. E. ROBERTS 2,560,369

METHOD OF MAKING FLEXIBLE TUBES

Filed March 18, 1946

3 Sheets-Sheet 1

INVENTOR
ROBERT ELDON ROBERTS.
BY Bates, Teare McBean,
Attorneys.

July 10, 1951     R. E. ROBERTS     2,560,369
METHOD OF MAKING FLEXIBLE TUBES
Filed March 18, 1946     3 Sheets-Sheet 2
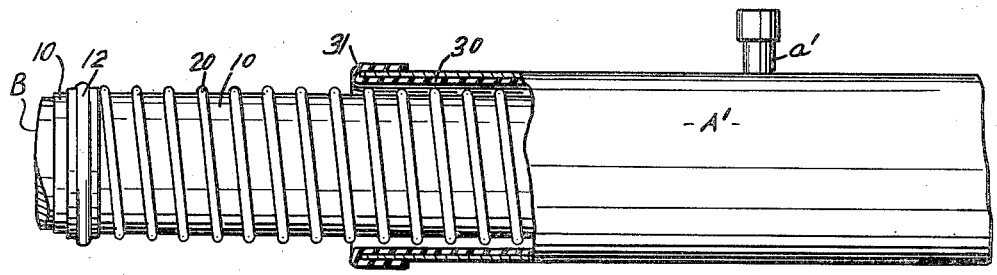
FIG. 5
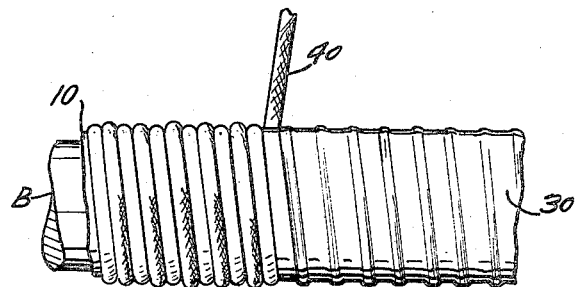
FIG. 6
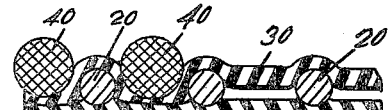
FIG. 7
FIG. 8
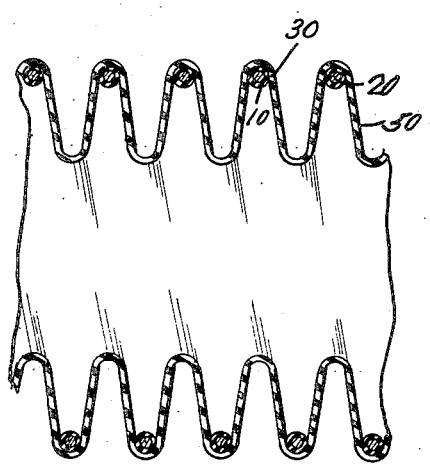
FIG. 9
INVENTOR.
ROBERT ELDON ROBERTS.
BY
*attorneys*

July 10, 1951  R. E. ROBERTS  2,560,369
METHOD OF MAKING FLEXIBLE TUBES
Filed March 18, 1946  3 Sheets-Sheet 3

INVENTOR.
ROBERT ELDON ROBERTS.
BY
ATTORNEYS

Patented July 10, 1951

2,560,369

UNITED STATES PATENT OFFICE 2,560,369

METHOD OF MAKING FLEXIBLE TUBES

Robert Eldon Roberts, Ridgefield, Conn.

Application March 18, 1946, Serial No. 655,268

3 Claims. (Cl. 154—8)

This application is a continuation-in-part of my copending application, Ser. No. 581,842, filed March 9, 1945.

This invention relates to a method of making a flexible impervious tube for various uses, where it is important that the tube be readily flexed without danger of it being collapsed to shut off its passage. My tube is flexible and resilient and may be stretched or compressed axially or bent in any direction. It is well adapted for use with gas masks, oxygen helmets, anaesthetizing apparatus, for instance, or with various equipment where a flexible non-collapsible conduit is desired.

An object of the invention is to provide simple and effective means for making such a tube which while being comparatively light in weight and very flexible shall be thoroughly impervious on both the interior and exterior.

I have illustrated herein two somewhat different forms of corrugated tube produced by somewhat different steps of manufacture having in common, as explained in the following description, with reference to the accompanying drawings.

Figure 1:
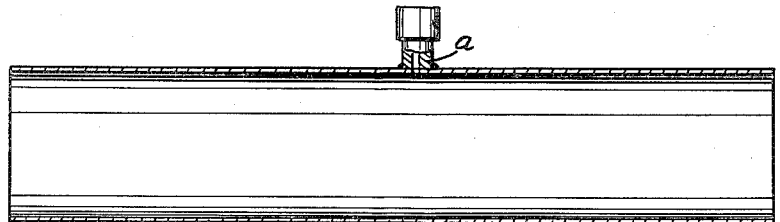
Figure 2:
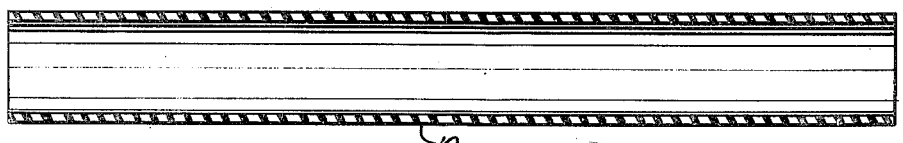
Figure 3:
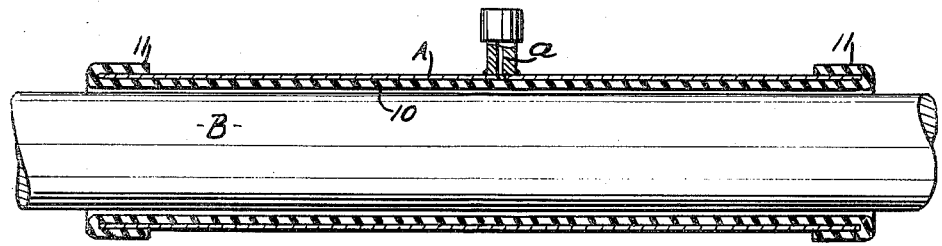
Figure 4:
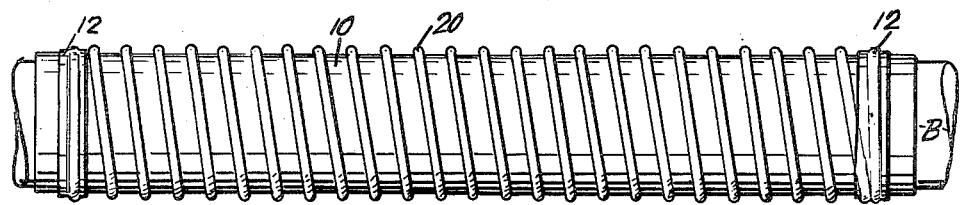
Figure 10:
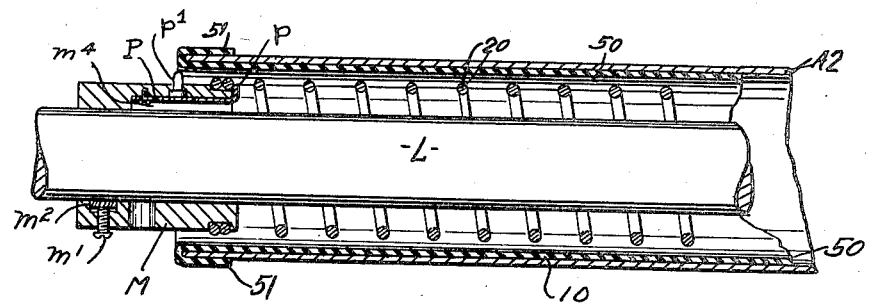
Figure 11:
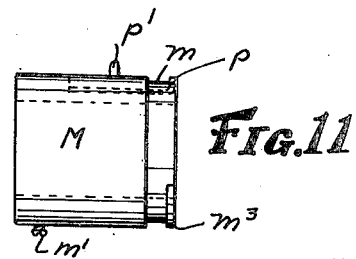
Figure 12:
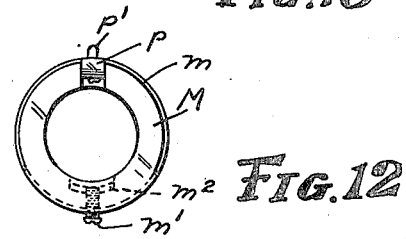
Figure 13:
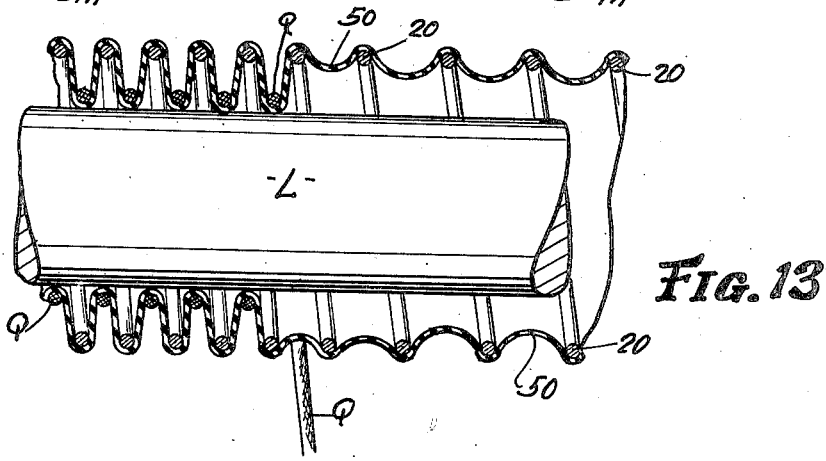
Figure 14:
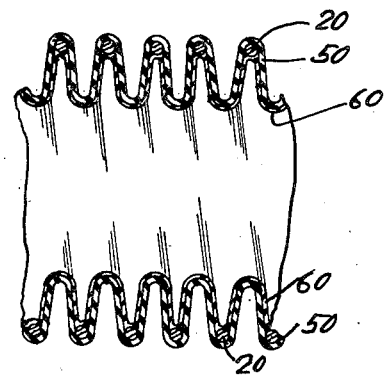

In the drawings, Fig. 1 is an axial section through a forming device which may be used in performing this invention; Fig. 2 is an axial section of an elastic tube of rubber or similar material which may constitute the foundation or the covering of the composite tube produced by this invention; Fig. 3 is an axial section illustrating the use of the forming device of Fig. 1 to seat the tube of Fig. 2 on a rigid mandrel; Fig. 4 is an elevation showing the mandrel of Fig. 3 with the foundation tube seated thereon and a spring applied to the exterior of such tube; Fig. 5 is an elevation partly broken away, showing the construction of Fig. 4 with an outer tube being placed in position to cover the stretched spring; Fig. 6 is an elevation of the construction of Fig. 5 with an external cord being applied to bind in the outer tube about the spring; Fig. 7 is an enlarged longitudinal section of the construction of Fig. 6; Fig. 8 is a cross section of the spring itself encased in rubber effected by the severance of the construction of Figs. 5 or 6; Fig. 9 is an axial section of the finished corrugated tube with the encased spring of Fig. 8; Fig. 10 is an axial section through a modified form of tube in the process of manufacture; Figs. 11 and 12 are respectively a side elevation and an end view of the spring-holding device of Fig. 10; Fig. 13 is a view of the same modified tube in the process of being corrugated; Fig. 14 is an axial section of this modified form of completed tube.

In its general aspects, my tube includes a helical spring stretched from its normal condition of rest but to an extent less than its elastic limit which condition I term "partially stretched," and anchored at its ends to a flexible impervious covering tube of material similar to rubber. There is a suitable protection on the inner side of the spring which may be a complete foundation tube, or other protecting means.

In the first variant of the method, producing the complete tube of Fig. 9, I utilize first a preliminary tube shown at 10 in Fig. 2 having a comparatively thin wall and open ends. I desire to seat this tube on a mandrel which has a greater external diameter than the internal diameter of the tube. To stretch the tube and mount it on the mandrel, I employ the piece of apparatus indicated at A, on Fig. 1. This apparatus comprises a rigid open-ended tube of metal or similar material having a length shorter than the elastic tube 10 and having an internal diameter greater than the external diameter of the elastic tube. The forming tube or sleeve A is equipped with an external nipple $a$ having a bore communicating with the interior of the sleeve through the wall thereof. A suitable suction connection may be attached to this nipple $a$.

I place the elastic tube 10 within the forming sleeve A with the ends of the tube projecting beyond the sleeve, and I bend the ends of the tube 10 outwardly and backwardly over the ends of the sleeve, as indicated at 11 in Fig. 3. I call this operation "cuffing" the ends of the tube. I now apply suction to the nipple $a$ (which may be by a suitable hose attached to the nipple) and exhaust the air between the rubber tube and the sleeve, thereby stretching the rubber tube and causing it to seat snugly on the inner wall of the sleeve A as shown in Fig. 3.

The next step is to place within the lined sleeve a rigid mandrel B (Fig. 3) having an external diameter less than the internal diameter of the lined sleeve but greater than the internal diameter of the tube 10 in its original condition as shown in Fig. 2. The exterior of this mandrel may be treated with soapstone or similar material to prevent the rubber tube adhering to it at a later stage in the operation.

I now release the vacuum through the passageway in the nipple $a$ and I free the cuffs 11 from the exterior of the sleeve A, and instantly the tube 10 by its own elasticity contracts and snaps down onto the mandrel B, snugly embracing it by reason of the still stretched condition of the tube 10.

The tube 10 is the foundation tube or inner tube of the first form of my composite reinforced corrugated tube about to be explained. Over this foundation tube, while it is on the mandrel B, I place a helical spring 20, preferably of metallic spring wire, and I stretch it to space its coils, as shown in Fig. 4. This stretching is for an amount less than the elastic limit of the spring, so that the helix tends to contract but may be further expanded in the manipulation of the complete tube.

The stretching of the spring brings the coils into snug engagement with the exterior of the preliminary tube 10, and in this condition the ends of the spring are anchored to the tube. In effecting this anchoring, I may make a plurality of turns of the spring in a direction normal to the axis of the tube and cover those coils with binding rubberized tape 12, Fig. 4. The stretched and anchored spring is to be covered by an outer preliminary tube secured to the exterior of the inner tube, as about to be described.

In making the outer tube, I prefer to proceed in the manner illustrated in Fig. 5. I mount a tube 30 within a forming sleeve A' (Fig. 16) similar to the sleeve A but preferably of somewhat larger diameter, and I cuff the ends of the tube 30 over onto the outside of the former, as shown at 31. I then apply vacuum to the space between the tube and sleeve wall through a communicating nipple $a'$, thus firmly seating the tube against the interior of the forming sleeve, as shown.

I now cover with rubber cement the exterior of the seated tube and the spring 20 of Fig. 4, while on the mandrel B, and insert such covered mandrel into the space within the lined sleeve of Fig. 5. I then release the vacuum to the nipple $a'$ and turn back the cuffs 31, and instantly the outer tube snaps down onto the spring-embraced inner tube, by reason of the elasticity of the tube 30, which in its normal condition before being mounted in the sleeve A' was of less internal diameter than the external diameter of the tube 10 on the mandrel B. In fact, I find it convenient to make the original tube 30 before the stretching an exact duplicate of the tube 10, as such tube will readily stretch to a large enough diameter to be conveniently spaced over the seated tube 10 and its spring. The spring 20 while stretched from a close coiled construction nevertheless has its coils quite close together, being separated by a distance perhaps twice the diameter of the spring wire.

The next step in this method is to force inwardly the outer preliminary tube 30 into contact with the inner preliminary tube 10 between the spring coils so that the wire of the spring becomes completely encased. This operation is illustrated in Figs. 6 and 7. As there shown, I wind a cord 40 tightly about the rubber of the outer tube between the spring coils and force it into engagement with the inner tube between the spring coils while the inner tube is on the mandrel.

After this is done and the cord 40 removed I cut the material of the two tubes in a spiral direction between the spring coils, thus leaving the spring individually encased in rubber, as shown in Fig. 8. In this operation of encasing the spring the spacing of the coils is only sufficient to allow for pulling the external covering into engagement with the internal covering, as shown in Fig. 7.

The rubber-like material embracing the spring coils may remain in the raw condition until the final step of vulcanization, or it can be given a preliminary vulcanization following the winding done by the external cord or wire. If given a preliminary vulcanization, the encased spring should be coated with cement before the application of the final sheath.

The rubber encased spring is now placed about a mandrel materially smaller than the interior of the spring and stretched considerably beyond its condition when encased but still less than its elastic limit. The mandrel and spring bear the relation to each other, shown in Fig. 10, though the spring in that figure is not encased. I now proceed to put an outer tubular member over the encased spring on the mandrel. The mounting of this outer member may be effected in any convenient manner, but I prefer to employ a hollow mandrel A—2, as shown in Fig. 10, and mount within it a rubber sleeve 50. As shown at 51 in that figure, the ends of the sleeve are cuffed over the ends of the hollow mandrel and vacuum applied. Now I release the vacuum on the mandrel and uncuff the ends of the sleeve, so that it springs down onto the encased spring.

If desired, I may employ for holding the ends of the stretched spring, the construction shown in Figs. 10, 11 and 12, hereinafter explained in detail in connection with the modification illustrated in Figs. 10 to 14.

The next step in this operation is to corrugate the outer tube by forcing it inwardly between the coils of the encased spring. This is done by winding a cord around the outer tube while on the spaced mandrel L and pulling the outer tube down into engagement with the mandrel just as illustrated with the bare spring in Fig. 13. After the outer tube has been corrugated the device is vulcanized and I have thus produced the tube illustrated in Fig. 9, wherein it will be seen that the spring is completely encased in rubber, though the rest of the completed article has only a single thickness of rubber in its wall 50. This provides for the manufacture of a comparatively cheap tube suitable for many purposes.

A modification in the method of protecting the spring on the inner face of the final product is illustrated in Figs. 10 to 14, which I will now describe in connection with the illustrations of Figs. 1, 2 and 3.

As illustrated by Figs. 10, 11 and 12, I take a rigid mandrel L and mount upon it a pair of sleeves M having a rabbet $m$ at the end. Only one of the sleeves is shown, but the other is a duplicate, facing in the opposite direction. These sleeves are normally held in place by set screws $m'$ bearing against shoes $m$—2 (Fig. 10) which bear against the mandrel. The rabbeted end of each sleeve is provided with a lip $m$—3 converting the rabbet into a groove in that location. Diametrically opposite the lip $m$—3, I form a longitudinal groove $m$—4 in the sleeve and I mount with this a leaf spring P having an outwardly turned end $p$ which overhangs the rabbet and normally converts it into a groove at that location. A projection or button $p'$ secured to the exterior of the spring projects freely through an opening in the sleeve.

In using the device just described, I place my usual helical spring 20 over the mandrel and place the end coils thereof into the groove provided by the rabbet, these coils being first hooked across the lip $m$—3 and then the leaf spring P pressed inwardly by the button $p'$ so that the final coils of the helical spring 20 may be passed beyond the end portion $p$ of the leaf spring and into the groove, as shown at Fig. 10. The sleeves M are then properly spaced so that the spring is stretched the desired amount.

I now proceed to use such vacuum device as heretofore described, namely, the external forming sleeve A (Fig. 1) having the rubber tube 10 mounted within it and with the ends 11 cuffed over the ends of the forming sleeve, vacuum benig applied, as indicated in Fig. 3, to hold the rubber sleeve in position against the inner wall of the forming sleeve. After this device, shown at A—2 in Fig. 10, is placed over the stretched spring, I release the vacuum and uncuff the ends of the rubber tube allowing it to spring down by its own elasticity onto the exterior of the helical spring.

Now I remove the forming sleeve and wind on the exterior of the seated rubber tube a cord Q in a course between the coils of the helical spring to bring the rubber down onto the mandrel, as shown in Fig. 13. During this action one of the sleeves M is unlocked from the mandrel by slightly loosening its set screw m' so that it is allowed to creep under frictional restraint gradually toward the other sleeve as the tube shortens and the helical spring contracts as illustrated.

As soon as the cord winding has been completed and while it is still in place, it and the wound tube is slid off of the mandrel, the cord winding making the corrugated tube stiff enough so that it may be handled, and then I pour into the tube, vultex or latex or rubber cement to form a protecting coating about the interior of the tube and across the spring. I then cure the resultant product by air cure or other vulcanization, thus producing the finished tube of Fig. 14, wherein 60 represents the vulcanized lining which was applied as a liquid.

The tube of Fig. 14 may be a very light construction not withstanding that the sheath is preferably thicker than where an internal foundation tube is employed as heretofore described, but the sheath need be only thick enough so that with its internal coating it will furnish sufficient body to afford the desired compression strength to resist the collapsing of the spring. On the other hand, where an internal tubular body is provided as a foundation member, the external sheath may be very light as heretofore described, or, if desired, the foundation tube may be light enough so that it is merely a protection for the spring and a thicker sheath relied on to furnish the resistance to compression under the action of the spring.

It will be seen that whether I make the corrugated tube by the steps of the method first described or that of the second method, I have in either case produced a light simple tube comprising an inwardly corrugated impervious elastic tubular member and a stretched coil spring, the inner side of the tube at the outer crests of the corrugations being thoroughly protected by rubber-like material on its inner region. Accordingly, the tube produced may be used for various purposes without danger of injury to the spring or contamination of the contents and the tube is extremely flexible and may be extended or compressed or deflected in any direction, as desired.

I claim:

1. The method of making a reinforced flexible tube comprising partially stretching a helical spring in radial spaced relation on a mandrel, radially expanding an elastic rubber tube, inserting the mandrel and spring within the expanded rubber tube, allowing the expanded tube to contract and elastically embrace the spring, pressing the outer rubber tube inwardly against the mandrel between the coils of the spring, and thereafter providing a protective covering on the inner surface of the spring of a different character from the outer tube.

2. The method of making a reinforced flexible tube comprising taking a bare mandrel, surrounding it by a partially stretched helical spring in radial spaced relation therefrom, radially expanding a rubber tube about the helical spring, allowing the rubber tube to contract and elastically embrace the spring, pressing the outer rubber tube inwardly against the mandrel between the coils of the spring, and covering the inner surface of the spring with protecting material which does not materially affect the stretchability of the outer tube.

3. The method of making a reinforced flexible tube comprising partially stretching a helical spring in radial spaced relation on a mandrel, inserting the mandrel and spring into a radially expanded rubber tubular sheath, allowing the expanded sheath to contract and elastically embrace the spring, wrapping the rubber sheath between the turns of the spring to force the sheath down onto the internal mandrel thereby corrugating the sheath, then removing the spring and corrugated sheath from the mandrel and providing a protective covering on the inner surface of the spring with material which does not substantially affect the stretchability of the outer sheath.

ROBERT ELDON ROBERTS.

REFERENCES CITED

The following references are of record in the file of this patent:

UNITED STATES PATENTS

| Number | Name | Date |
| --- | --- | --- |
| 713,559 | Dodge | Nov. 11, 1902 |
| 1,015,120 | Atwood | Jan. 16, 1912 |
| 1,023,527 | Smith | Apr. 16, 1912 |
| 1,576,767 | Loomis et al. | Mar. 16, 1926 |
| 2,045,540 | Debenedetti | June 23, 1936 |
| 2,052,151 | Van Voorhis | Aug. 25, 1936 |
| 2,128,635 | Charch | Aug. 30, 1938 |
| 2,176,762 | Forbes | Oct. 17, 1939 |
| 2,321,064 | Broedling | June 8, 1943 |
| 2,330,651 | Welger | Sept. 28, 1943 |
| 2,343,747 | Chernack | Mar. 7, 1944 |
| 2,430,081 | Roberts et al. | Nov. 4, 1947 |